United States Patent [19]

Osterwisch

[11] Patent Number: 5,758,938
[45] Date of Patent: Jun. 2, 1998

[54] SOLAR CONCENTRATOR ELEVATIONAL DRIVE MECHANISM

[75] Inventor: Carl E. Osterwisch, Ann Arbor, Mich.

[73] Assignee: Stirling Thermal Motors, Inc., Ann Arbor, Mich.

[21] Appl. No.: 685,632

[22] Filed: Jul. 24, 1996

[51] Int. Cl.⁶ ................. G03B 21/00; F24J 2/54
[52] U.S. Cl. ................................ 353/3; 126/600
[58] Field of Search ................. 353/3; 126/571, 126/600, 696

[56] References Cited

U.S. PATENT DOCUMENTS

| | | |
|---|---|---|
| 4,264,145 | 4/1981 | Urruela. |
| 4,491,388 | 1/1985 | Wood ........................... 126/600 |
| 4,583,520 | 4/1986 | Dietrich et al. ................. 353/3 |
| 4,585,318 | 4/1986 | Seifert ........................... 353/3 |
| 4,707,990 | 11/1987 | Meijer. |
| 4,930,493 | 6/1990 | Sallis ............................ 353/3 |
| 4,995,377 | 2/1991 | Eiden ........................... 353/3 |
| 5,253,637 | 10/1993 | Maiden ......................... 353/3 |

OTHER PUBLICATIONS

Sandia National Laboratories Contract Report, "Development of a Low–Cost Drive Tracking Mechanism Solar—Solor—Heliostats or PV Arrays," Winsmith, Subsidiary of Peerless Winsmith, Inc.

*Primary Examiner*—William Dowling
*Attorney, Agent, or Firm*—Harness, Dickey & Pierce, PLC

[57] ABSTRACT

A mechanism for elevationally driving a solar concentrator pivotally mounted on a pedestal between a zenith facing position, a horizon facing position, a downward facing position, and any intermediate position, using a single linear actuator. A lower bar is pivotally connected to the pedestal and an upper bar is pivotally connected to the solar concentrator. The lower bar and the upper bar are connected to a slider having a follower nut section which is driven by a linear actuator, having a motor driven lead screw, which is attached to the pedestal or an offset support structure portion of the solar concentrator.

18 Claims, 3 Drawing Sheets

SOLAR CONCENTRATOR ELEVATIONAL DRIVE MECHANISM

BACKGROUND AND SUMMARY OF THE INVENTION

The present invention relates to a mechanism for elevationally driving a solar concentrator and in particular to a mechanism that allows a solar concentrator to be elevationally driven between a zenith facing position, a horizon facing position, a downward facing position, and any intermediate position, using a single linear actuator.

Solar concentrators are typically large reflectors, or arrays of smaller reflectors which are supported by a framework that allows them to be oriented toward the sun. A great deal of interest is being expressed in solar powered electricity generation systems that utilize these solar concentrators in combination with solar receivers. Stirling cycle engines and electrical generators to generate commercial quantities of electricity. The Stirling cycle engines and related devices for utilizing solar energy used in connection with the inventive solar concentrator elevational drive mechanism could include those previously developed by the Assignee of the present invention, Stirling Thermal Motors, Inc., including those described in U.S. Pat. Nos. 4,707,990; 4,715,183, 4,785,633, and 4,911,144, which are hereby incorporated herein by reference.

To effectively concentrate solar energy, the solar concentrators must rotate daily in two directions, azimuthally (from a generally east facing position at sunrise to a generally west facing position at sunset) and elevationally (from a horizon facing position at sunrise to a maximum solar elevation facing position (which will be lower than or equal to the zenith facing position) in the middle of the day and back to a horizon facing position at sunset) to track the sun. The azimuthal rotation is also known as horizontal rotation and the elevational rotation is also known as vertical rotation. Because solar concentrators are only required to have a elevational range of motion from the horizon facing position to the zenith facing position (only 90° of elevational travel) to operate, prior art solar concentrator elevational drive mechanisms have typically been limited to this range.

Operators of solar powered electrical generation systems have realized, however, that it would often be advantageous to place the solar concentrator in a downward facing position when stowing the solar collection system, such as when it is inoperable (at night or during repairs for instance) or when it was likely to be damaged by the elements (during hail storms or thunderstorms for instance). Solar concentrators have generally been placed in the horizon facing position when the solar collection system is stowed to reduce the amount of dust and debris collected on the surface of the concentrator. The amount of dust and debris collecting on the solar concentrator in the horizon facing position is substantially less than the amount it would collect in the zenith facing position or in any position between the horizon facing position and the zenith facing position. Dust and debris on the reflecting surface of the solar concentrator reduces its efficiency in concentrating solar energy. In the horizon facing position, however, the concentrator presents the greatest apparent cross section and resistance to the wind forces which increases the likelihood of fatigue or failure of the solar concentrator support structure. Wind blown particles, such as sand, can also damage the reflecting surface of the concentrator when it is placed in the horizon facing position. Precipitation, particularly hail, can cause severe damage to the reflecting surface of a solar concentrator when it is in the zenith facing position, the horizon facing position or in any position between the horizon facing position and the zenith facing position.

By placing the solar concentrator in the downward facing position, however, all of these problems are reduced or eliminated. Little to no dust or debris collects on the reflecting surface of the concentrator when it is in the downward facing position. The apparent cross section and resistance to the wind is also minimized. Wind blown particles have little to no chance of damaging the reflecting surface of the concentrator. Precipitation, such as hail, can be harmlessly deflected by a cover on the back surface of the solar concentrator.

Prior designs of mechanisms to drive a solar concentrator between the zenith facing position and the downward facing position have utilized a pair of linked conventional 90° elevational drive mechanisms. If both of these mechanisms are simultaneously moved to their maximum degree of travel in either direction, the solar concentrator can be rotated between the zenith facing position and the downward facing position. While this linked combination of mechanisms produces the desired degree of elevational travel in the solar concentrator, it doubles the cost, doubles the amount of maintenance required, and doubles the likelihood of mechanical failure when compared to a single conventional 90° elevational drive mechanism. To package the pair of conventional mechanisms, it is often necessary to offset the operating planes of the mechanisms, which introduces undesirable torsional forces into the combined mechanism. To overcome these problems, the inventive mechanism utilizes a single linear actuator connected to a pair of bars that are in turn connected to the concentrator/receiver support arm and the pedestal supporting the solar concentrator and the solar receiver. This mechanism creates a planar four-bar linkage, with one degree of freedom, that allows for a full 180° elevational rotation of the solar concentrator using only a single linear actuator. Because the linear actuator is connected to opposing members of the linkage, in essence, a five-bar linkage or structure is formed. The linear actuator member acts as a strut or a brace that assists the mechanism in resisting compression and tension forces. This is important because commercial solar concentrators and associated equipment are often very large (a reflector array may have a diameter of fifteen meters for instance) and gravitational and wind related forces place substantial forces on the solar concentrator elevational drive mechanisms used in these applications. In a preferred embodiment of the invention, the linear actuator member consists of a motor driven lead screw which meshingly engages a follower nut section of a slider which connects upper and lower bars which are pivotally connected to the pedestal and the solar concentrator. By moving the slider in and out along the lead screw, the solar concentrator can be rotated from a downward facing position to a zenith facing position and back to a downward facing position.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
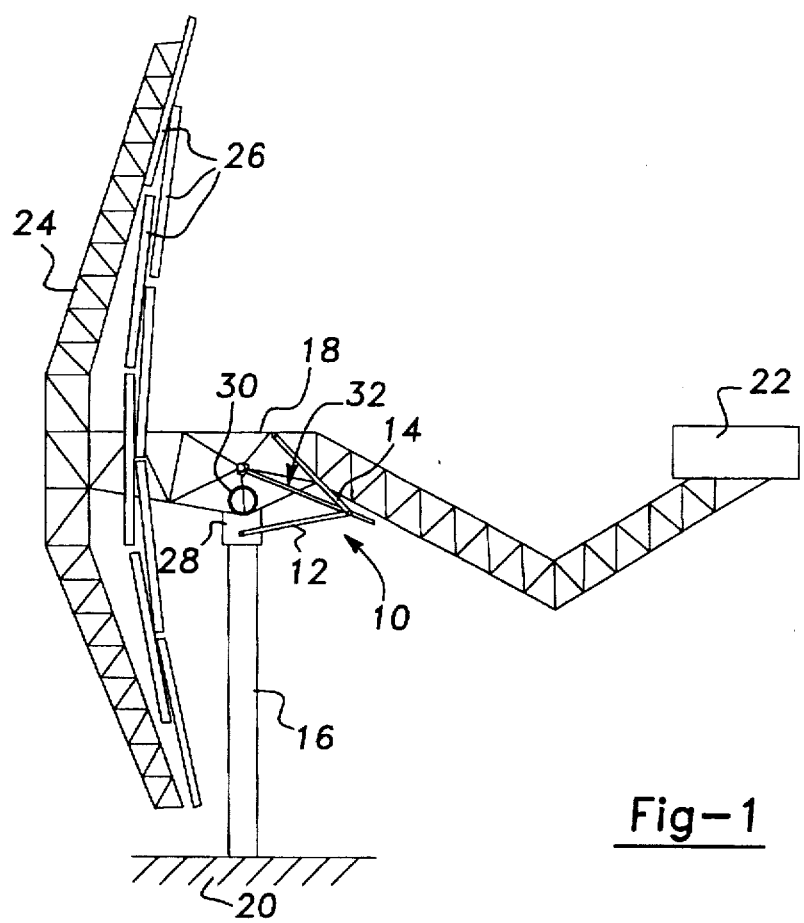
FIG. 1 is a side view of the solar concentrator, solar receiver, pedestal and elevational drive mechanism in the horizon facing position.

The solar concentrator elevational drive mechanism of the present invention is shown in FIG. 1 and is designated generally as 10. Solar concentrator elevational drive mechanism 10 includes a lower bar 12 and an upper bar 14. Lower bar 12 is pivotally connected to pedestal 16 (by a rotatable collar 28 as described below) and to upper bar 14. Upper bar 14 is pivotally connected to lower bar 12 and to concentrator/receiver support arm 18. Pedestal 16 is fixed to the ground 20, typically through the use of a footer or support pad, and supports the entire solar concentrator/receiver structure. Concentrator/receiver support arm 18 supports both solar receiver 22 and solar concentrator framework 24. Reflector facets 26 are connected to and supported by solar concentrator framework 24. The term "solar concentrator" as used in this application refers to the solar reflecting surface (such as reflector facets 26), the framework supporting this solar reflecting surface (such as solar concentrator framework 24), the support structure connected to this framework as it rotates about the pedestal (such as concentrator/receiver support arm 18) and any other equipment which is attached to the support structure which rotates about the pedestal (such as solar receiver 22).

Because the solar concentrator must rotate azimuthally as well as elevationally to follow the sun, the upper portion of pedestal 16 must be able to rotate azimuthally or a azimuthal drive mechanism must be used to connect pedestal 16 to concentrator/receiver support arm 18. In this embodiment, an azimuthal drive mechanism (not shown) is incorporated between pedestal 16 and collar 28 which allows collar 28 to rotate azimuthally about pedestal 16.

Concentrator/receiver support arm 18 elevationally rotates with respect to pedestal 16 about concentrator/receiver pivot 30. The mechanism which allows concentrator/receiver support arm 18 to rotate about pedestal 16 at concentrator/receiver pivot 30 incorporates bearings or similar components to allow the concentrator/receiver support arm to freely pivot even while supporting the substantial weight of the concentrator/receiver support arm, solar concentrator framework 24, reflector facets 26 and solar receiver 22. The center of gravity of the components rotating about concentrator/receiver pivot 30 is typically engineered to be as close as possible to the center of concentrator/receiver pivot 30 to reduce the force required to rotate these components about the concentrator/receiver pivot. As will be described in more detail below, solar concentrator elevational drive mechanism 10 is actuated by a linear actuator 32 which is attached to lower bar 12, upper bar 14 and concentrator/receiver support arm 18.

Figure 2:
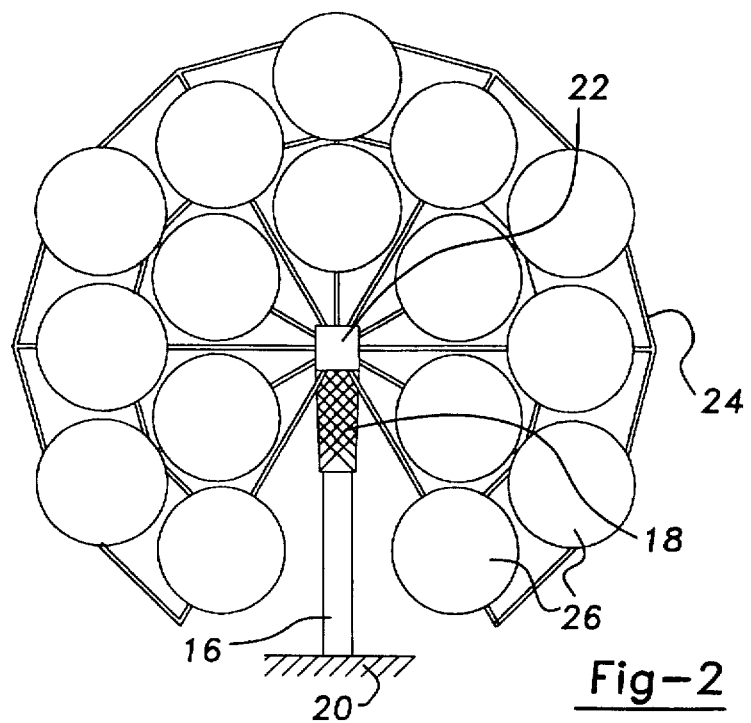
FIG. 2 is a front view of the solar concentrator, solar receiver, pedestal and elevational drive mechanism from FIG. 1.

A front view of reflector facets 26, solar concentrator framework 24, solar receiver 22 and pedestal 16 are shown in FIG. 2. As can be clearly seen in FIG. 2, reflector facets 26 are arranged in a generally circular manner about solar receiver 22. The solar energy reflected by reflector facets 26 is directed into solar receiver 22 where it is utilized, such as by a Stirling cycle engine/electrical generator combination which generates electricity. Reflector facets 26 are fixed to and supported by solar concentrator framework 24. Solar receiver 22 is supported by concentrator/receiver support arm 18 which is pivotally attached to pedestal 16 which is fixed to the ground 20.

It can be seen in FIG. 2 that the lower central portion of the solar concentrator framework and the center and two lower central reflector facets are not present in the array. The area that the center reflector facet would otherwise be located in is occupied by the portion of the concentrator/receiver support arm 18 which is connected to solar concentrator framework 24. The lower central portion of the solar concentrator framework and the two lower central reflector facets are omitted to create a cutout or notch in the array which prevents contact between the solar concentrator and pedestal 16 when the concentrator is rotated from the horizon facing position to the zenith facing position.

Figure 3:
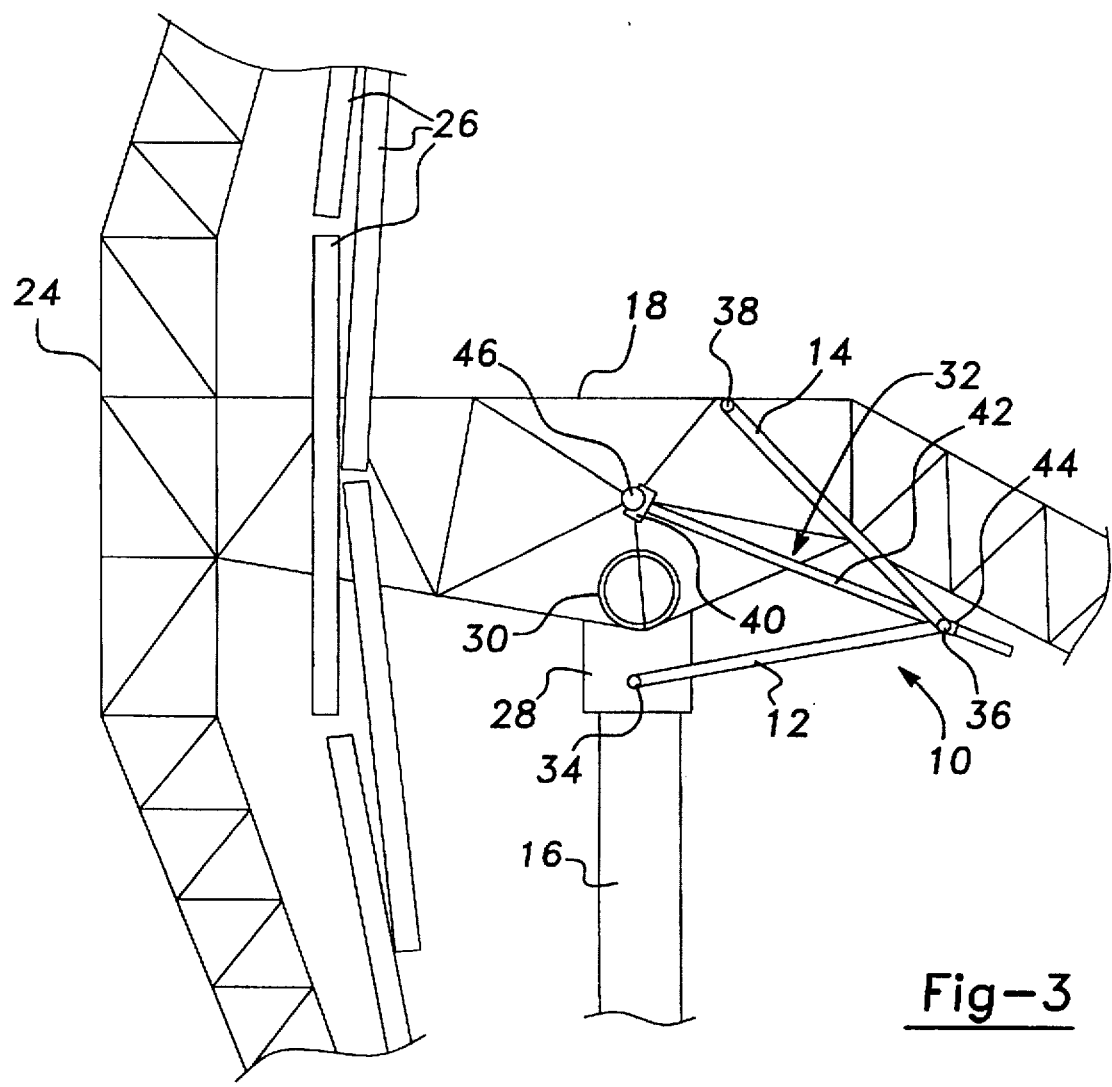
FIG. 3 is a close up side view of the solar concentrator, pedestal and elevational drive mechanism from FIG. 1 showing in particular the components of the elevational drive mechanism.

A close up view of solar concentrator elevational drive mechanism 10 is shown in FIG. 3. Solar concentrator elevational drive mechanism 10 includes lower bar 12 and upper bar 14. Lower bar 12 is pivotally connected to collar 28 (which is rotatably connected to pedestal 16 as described above) and to upper bar 14. Upper bar 14 is pivotally connected to lower bar 12 and to concentrator/receiver support arm 18. As described above, pedestal 16 is fixed to the ground 20. Concentrator/receiver support arm 18 supports solar receiver 22 and solar concentrator framework 24, which in turn supports reflector facets 26.

A planar four-bar linkage, with one degree of freedom, is formed by: lower bar 12 between the collar/lower bar pivot 34 and the lower bar/upper bar pivot 36, upper bar 14 between the lower bar/upper bar pivot 36 and the upper bar/support arm pivot 38, concentrator/receiver support arm 18 between the upper bar/support arm pivot 38 and the concentrator/receiver pivot 30, and collar 28 between the collar/lower bar pivot 34 and the concentrator/receiver pivot 30. This mechanism can be classified as a Grashof mechanism because (ignoring, for purposes of the analysis, physical interference between the link structures) one link is able to perform a complete rotation relative to the other three links. In the subject linkage, the link formed by the concentrator/receiver support arm 18 between the upper bar/support arm pivot 38 and the concentrator/receiver pivot 30 must be capable of a 180° rotation with respect to pedestal 16 and, therefore, if physical interference between the link structures is ignored, this link is capable of a complete rotation relative to the other three links.

Solar concentrator elevational drive mechanism 10 further includes a linear actuator 32 which drives the four-bar linkage. In this embodiment, linear actuator 32 includes an actuator motor 40, a lead screw 42 and a slider 44. Actuator motor 40 is pivotally connected to concentrator/receiver support arm 18 at the actuator/support arm pivot 46. When actuator motor 40 is energized, lead screw 42 is rotated either clockwise or counter-clockwise. Slider 44 has a follower nut portion which is meshingly engaged with lead screw 42. As lead screw 42 is rotated, slider 44 will be moved either toward actuator/support arm pivot 46 or away from the actuator/support arm pivot. Slider 44 is also connected to lower bar 12 and upper bar 14 at the lower bar/upper bar pivot 36. As slider 44 is moved toward actuator/support arm pivot 46, lower bar 12 is placed in a more inclined angle with respect to pedestal 16 and as slider 44 is moved away from actuator/support arm pivot 46, lower bar 12 is placed in a more declined angle with respect to pedestal 16.

While linear actuator 32 would still be able to rotate the four-bar linkage if slider 44 was connected to either lower bar 12 or upper bar 14 anywhere between the collar/lower bar pivot 34 and the upper bar/support arm pivot 38, by attaching slider 44 to the lower bar/upper bar pivot 36 and having lower bar 12 and upper bar 14 pivotally connected to slider 44, the forces transmitted by linear actuator 32 through slider 44 will be directionally aligned with the body of the bars and will cause only compression or tension forces within the bars. If slider 44 was attached to either lower bar 12 or upper bar 14 anywhere else between the collar/lower bar pivot 34 and the upper bar/support arm pivot 38, undesirable bending moments would be created within the bar which slider 44 was attached to.

Linear actuator 32, by being connected to opposing members of the four-bar linkage creates, in essence, a five-bar linkage or structure. The linear actuator acts as a strut or a brace which assists the mechanism in resisting compression and tension forces within the linkage. This is important because the reflector facets 26 and solar concentrator framework 24 are typically very large and the solar receivers are generally quite heavy. The gravitational and wind related forces that are typically placed on solar concentrator elevational drive mechanisms are often substantial. The forces which each member of the elevational drive mechanism is subjected to can change dramatically as the solar concentrator is rotated from the zenith facing to the downward facing position. Linear actuator 32 may, for instance, be in tension when the solar concentrator is in the downward facing position and may be in compression when the solar concentrator is in the zenith facing position.

Linear actuator 32 will typically be configured so that slider 44 will reach its furthest outward travel position away from actuator/support arm pivot 46 when reflector facets 26 are in the downward facing position. As described above, reflector facets 26 would typically be placed in the downward facing position during nonoperative hours, such as at night or while repairs are being performed, to avoid the collection of dust and debris on the surface of the reflectors. They would also be placed into the downward facing position during periods of severe weather such as hail storms or heavy thunderstorms.

While linear actuator 32 could be any type of linear actuator mechanism which could support both tension and compression forces, such as a hydraulic cylinder, the use of an electric motor driven lead screw (and a braking mechanism, if necessary, to inhibit the motor from being backdriven), is very efficient because power must be applied to the electric motor only when the elevational angle of the solar concentrator needs to be changed.

Figure 4:
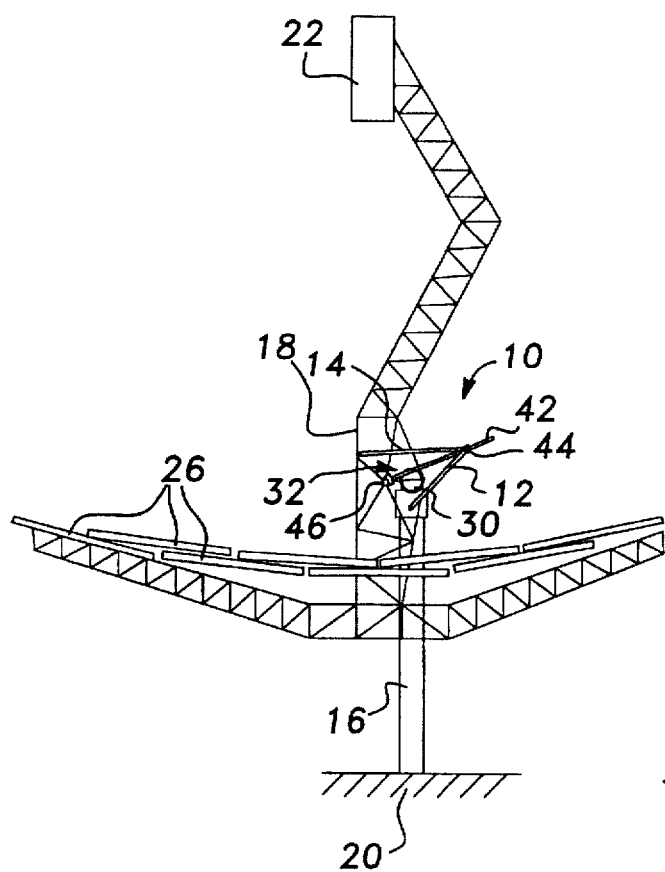
FIG. 4 is a side view of the solar concentrator, solar receiver, pedestal and elevational drive mechanism from FIG. 1 in the zenith facing position.

FIG. 4 shows solar concentrator elevational drive mechanism 10 and associated components from FIG. 1 after linear actuator 32 has moved slider 44 along lead screw 42 to its furthest inward travel position toward actuator/support arm pivot 46. Reflector facets 26 have been rotated from the horizon facing position to the zenith facing position. Lower bar 12 has changed its incline angle with respect to pedestal 16. Upper bar 14 has been rotated and translated with respect to pedestal 16. The portion of concentrator/receiver support arm 18 between the concentrator/receiver pivot 30 and the actuator/support arm pivot point 46 has been rotated from a vertical position to a horizontal position. This is the position that reflector facets 26 would be in when the sun is directly overhead.

Figure 5:
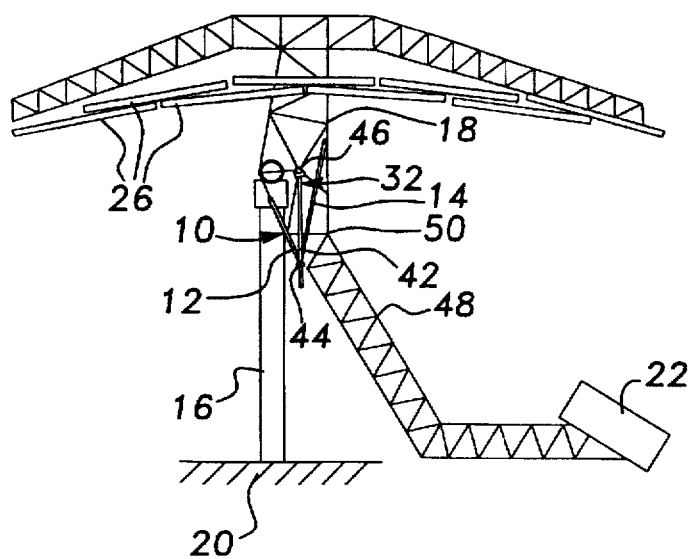
FIG. 5 is a side view of the solar concentrator, solar receiver, pedestal and elevational drive mechanism from FIG. 1 in the downward facing position.

FIG. 5 shows solar concentrator elevational drive mechanism 10 from FIG. 1 after linear actuator 32 has moved slider 44 to the furthest outward travel position away from actuator/support arm pivot 46 and reflector facets 26 have been rotated to the downward facing position. Lower bar 12 has again changed its incline angle with respect to pedestal 16. Upper bar 14 has again been rotated and translated with respect to pedestal 16. The portion of concentrator/receiver support arm 18 between the concentrator/receiver pivot 30 and the actuator/support arm pivot point 46 has been rotated to the opposite horizontal position, compared to the position of this portion in FIG. 4. As depicted in FIG. 5, linear actuator 32 will typically be configured so that slider 44 will reach its ultimate outward travel limit along lead screw 42 away from actuator/support arm pivot 413 when receiver facets 26 have been rotated to the downward facing position. This is the position the receiver facets would be in when the solar concentrator is placed in the stowed position.

As can be seen in FIG. 5, the height of pedestal 16 may not allow concentrator/receiver support arm 18 sufficient clearance to be rotated to a vertical downward facing position without colliding with the ground 20. To compensate for this potential interference, concentrator/receiver support arm 18 may be jointed. As shown in FIG. 5, as the solar concentrator is placed in the downward facing position, a receiver end portion 48 of concentrator/receiver support arm 18 can pivot about support arm pivot 50 to avoid colliding with the ground 20. In this position, access to solar receiver 22 can be obtained at ground level, allowing ready access to solar receiver 22 for maintenance or repair purposes.

As can be seen in FIGS. 1, 4 and 5, a complete 180° rotation of reflector facets 26, between the zenith facing position and the downward facing position, is made possible by solar concentrator elevational drive mechanism 10 using a single linear actuator and two bars pivotally connected to concentrator/receiver support arm 18 and collar 28 rotatably attached to pedestal 16. By placing reflector facets 26 in the downward facing position: no dust or debris collects on the reflecting surface of the facets, the apparent cross section and resistance to the wind of the concentrator is minimized, wind blown particles have little to no chance of damaging the reflecting surface of the reflector facets and precipitation, such as hail, can be harmlessly deflected by a cover attached to the back of the receiver facets.

The solar energy concentrated by the reflector facets 26 is focused into solar receiver 22 where the energy is transferred to a working fluid. This working fluid transfers the energy to a device that utilizes the energy, such as an attached Stirling cycle engine and electrical generator.

It is to be understood that the invention is not limited to the exact construction illustrated and described above, but that various changes and modifications may be made without departing from the spirit and scope of the invention as defined in the following claims.

I claim:

1. A mechanism for elevationally driving a solar concentrator pivotally connected to a pedestal, said mechanism comprising:

a lower bar pivotally connected to said pedestal, the center of the lower bar/pedestal pivot being a first distance from the center of the solar concentrator/pedestal pivot;

an upper bar pivotally connected to said lower bar and to said solar concentrator, said center of said lower bar/pedestal pivot being a second distance from the center of the lower bar/upper bar pivot, said center of said lower bar/upper bar pivot being a third distance from the center of the upper bar/solar concentrator pivot, and said center of said upper bar/solar concentrator pivot being a fourth distance from said center of said solar concentrator/pedestal pivot;

the sum of the maximum of said distances plus the minimum of said distances being smaller than the sum of the remaining said distances;

a linear actuator having a first end pivotally attached to said linked lower bar and upper bar between said lower bar/pedestal pivot and said upper bar/solar concentrator pivot and a second end pivotally attached to said linked solar concentrator and pedestal between said lower bar/pedestal pivot and said upper bar/solar concentrator pivot.

2. A mechanism according to claim 1 wherein the sum of said second distance plus said third distance is greater than the sum of said first distance plus said fourth distance.

3. A mechanism according to claim 2 wherein said second distance is greater than said first distance.

4. A mechanism according to claim 3 wherein said first end of said linear actuator is pivotally attached to said linked lower bar and upper bar at said lower bar/upper bar pivot.

5. A mechanism according to claim 4 wherein said second end of said linear actuator is pivotally attached to said solar concentrator between said solar concentrator/pedestal pivot and said solar concentrator/upper bar pivot.

6. A mechanism according to claim 5 wherein said linear actuator comprises a motor driven lead screw and a slider having a follower nut section meshingly engaged with said lead screw.

7. A mechanism for elevationally driving a solar concentrator pivotally connected to a pedestal, said mechanism comprising:

a lower bar pivotally connected to said pedestal, the center of the lower bar/pedestal pivot being a first distance from the center of the solar concentrator/pedestal pivot;

an upper bar pivotally connected to said lower bar and to said solar concentrator, said center of said lower bar/pedestal pivot being a second distance from the center of the lower bar/upper bar pivot, said center of said lower bar/upper bar pivot being a third distance from the center of the upper bar/solar concentrator pivot, and said center of said upper bar/solar concentrator pivot being a fourth distance from said center of said solar concentrator/pedestal pivot;

said second distance plus said third distance being greater than the sum of said first distance plus said fourth distance;

said second distance being greater than said first distance;

a linear actuator, comprising a motor driven lead screw and a slider having a follower nut section meshingly engaged with said lead screw, having a first end pivotally attached to said lower bar and said upper bar at said lower bar/upper bar pivot and a second end pivotally attached to said solar concentrator between said solar concentrator/pedestal pivot and said solar concentrator/upper bar pivot.

8. A mechanism according to claim 7 further including a collar which pivotally and rotatably connects said lower bar to said pedestal by being pivotally connected to said lower bar and rotatably connected to said pedestal.

9. A mechanism according to claim 8 wherein said solar concentrator is in a downward facing position when said first end and said second end of said linear actuator are a maximum travel distance away from each other and said solar concentrator is in a zenith facing position when said first end and said second end of said linear actuator are a minimum travel distance toward each other.

10. A solar concentrator assembly capable of being elevationally driven between a downward facing position, a horizon facing position, a zenith facing position and any intermediate position, said solar concentrator assembly comprising:

a pedestal;

a solar concentrator pivotally connected to said pedestal;

a lower bar pivotally connected to said pedestal, the center of the lower bar/pedestal pivot being a first distance from the center of the solar concentrator/pedestal pivot;

an upper bar pivotally connected to said lower bar and to said solar concentrator, said center of said lower bar/pedestal pivot being a second distance from the center of the lower bar/upper bar pivot, said center of said lower bar/upper bar pivot being a third distance from the center of the upper bar/solar concentrator pivot, and said center of said upper bar/solar concentrator pivot being a fourth distance from said center of said solar concentrator/pedestal pivot;

the sum of the maximum of said distances plus the minimum of said distances being smaller than the sum of the remaining said distances;

a linear actuator having a first end pivotally attached to said linked lower bar and upper bar between said lower bar/pedestal pivot and said upper bar/solar concentrator pivot and a second end pivotally attached to said linked solar concentrator and pedestal between said lower bar/pedestal pivot and said upper bar/solar concentrator pivot.

11. A solar concentrator assembly according to claim 10 wherein the sum of said second distance plus said third distance is greater than the sum of said first distance plus said fourth distance.

12. A solar concentrator assembly according to claim 11 wherein said second distance is greater than said first distance.

13. A solar concentrator assembly according to claim 12 wherein said first end of said linear actuator is attached to said linked lower bar and upper bar at said lower bar/upper bar pivot.

14. A solar concentrator assembly according to claim 13 wherein said second end of said linear actuator is attached to said linked solar concentrator between said solar concentrator/pedestal pivot and said solar concentrator/upper bar pivot.

15. A solar concentrator assembly according to claim 14 wherein said linear actuator comprises a motor driven lead screw and a slider having a follower nut section meshingly engaged with said lead screw.

16. A solar concentrator assembly capable of being elevationally driven between a downward facing position, a horizon facing position, a zenith facing position and any intermediate position, said solar concentrator assembly comprising:

a pedestal;

a solar concentrator pivotally connected to said pedestal;

a single actuator connected to said pivotally connected pedestal and solar concentrator;

transmission means connected to said single actuator and said pivotally connected pedestal and solar concentrator for transmitting the motion of said single actuator into rotational motion of said solar concentrator about said pedestal;

said single actuator and said transmission means allowing said solar concentrator to be elevationally driven between a downward facing position, a horizon facing position, a zenith facing position and any intermediate position, in response to the motion of said single actuator.

17. A solar concentrator assembly according to claim 16 wherein said single actuator comprises a motor driven lead screw and a slider having a follower nut section meshingly engaged with said lead screw.

18. A solar concentrator assembly according to claim 17 wherein said transmission means comprises a lower bar pivotally connected to said pedestal and an upper bar pivotally connected to said lower bar and to said solar concentrator.

* * * * *

UNITED STATES PATENT AND TRADEMARK OFFICE
CERTIFICATE OF CORRECTION

PATENT NO. : 5,758,938
DATED : June 2, 1998
INVENTOR(S) : Carl E. Osterwisch

It is certified that error appears in the above-identified patent and that said Letters Patent is hereby corrected as shown below:

Column 6, line 13, "413" should read --- 46 ---.

Signed and Sealed this

Eighth Day of September, 1998

Attest:

BRUCE LEHMAN

*Attesting Officer*     *Commissioner of Patents and Trademarks*